Nov. 9, 1926.
C. B. URANN
1,606,676
SPREADER
Filed June 24, 1925   3 Sheets-Sheet 1
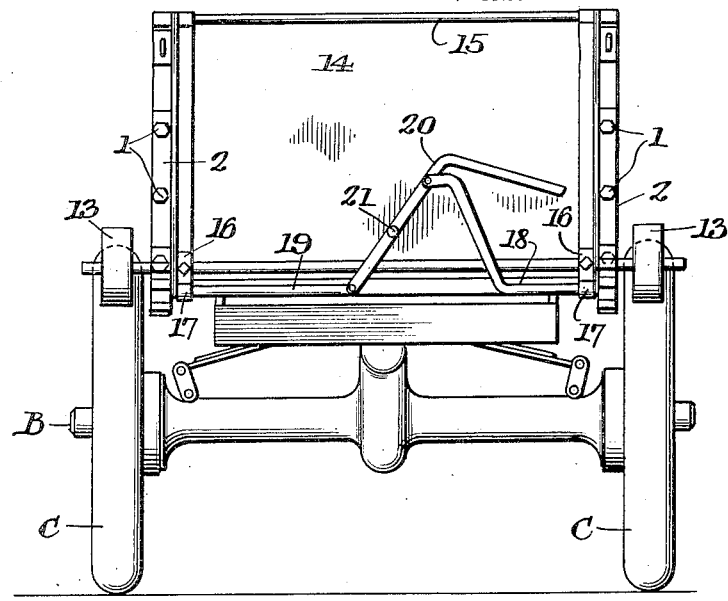
Fig. 1.
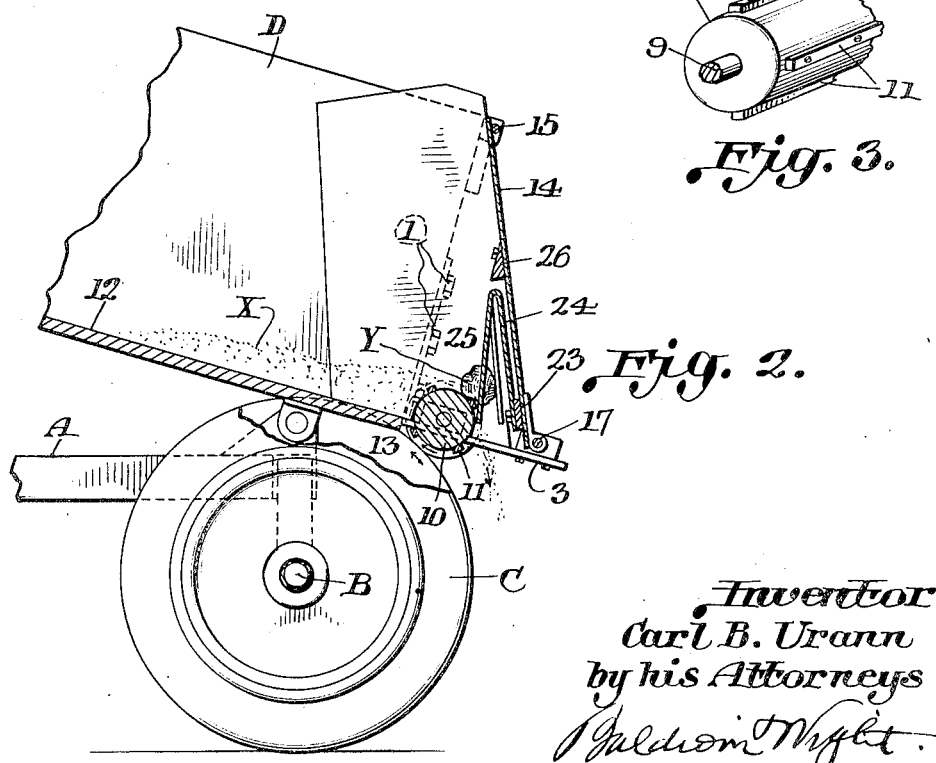
Fig. 2.
Fig. 3.
Inventor
Carl B. Urann
by his Attorneys Nov. 9, 1926.                                              1,606,676
                        C. B. URANN
                         SPREADER
                    Filed June 24, 1925        3 Sheets-Sheet 2
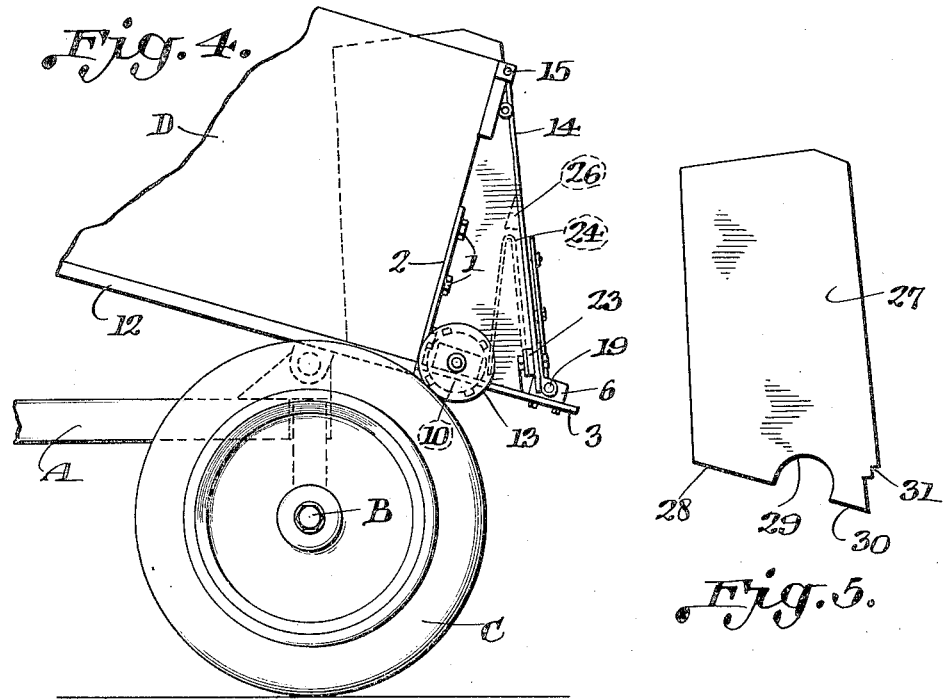
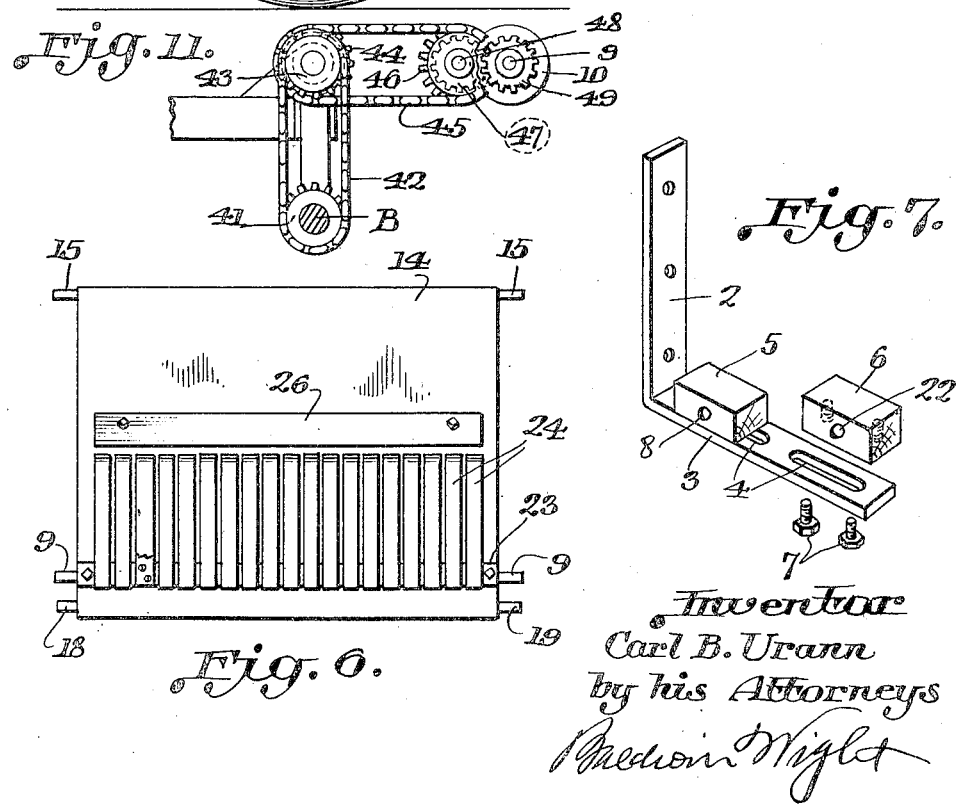
Inventor
Carl B. Urann
by his Attorneys Nov. 9, 1926. 1,606,676
C. B. URANN
SPREADER
Filed June 24, 1925  3 Sheets-Sheet 3
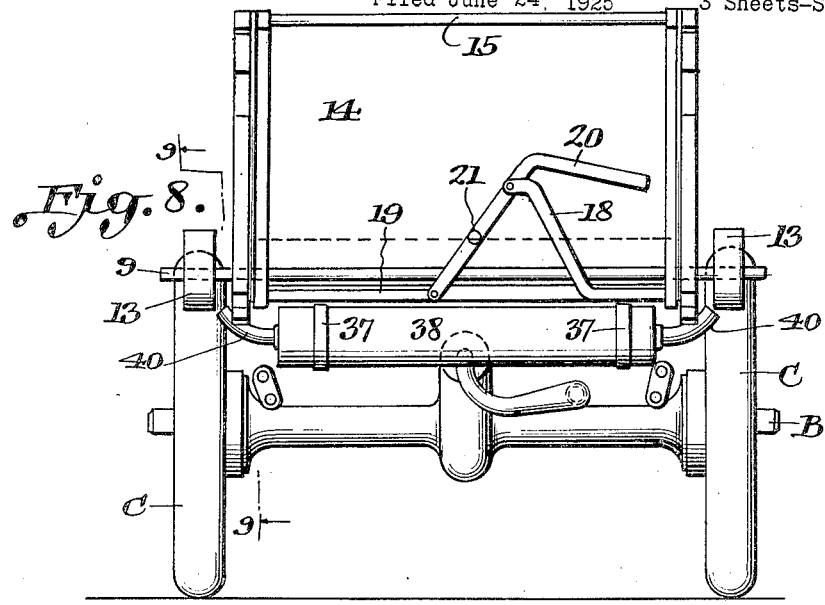
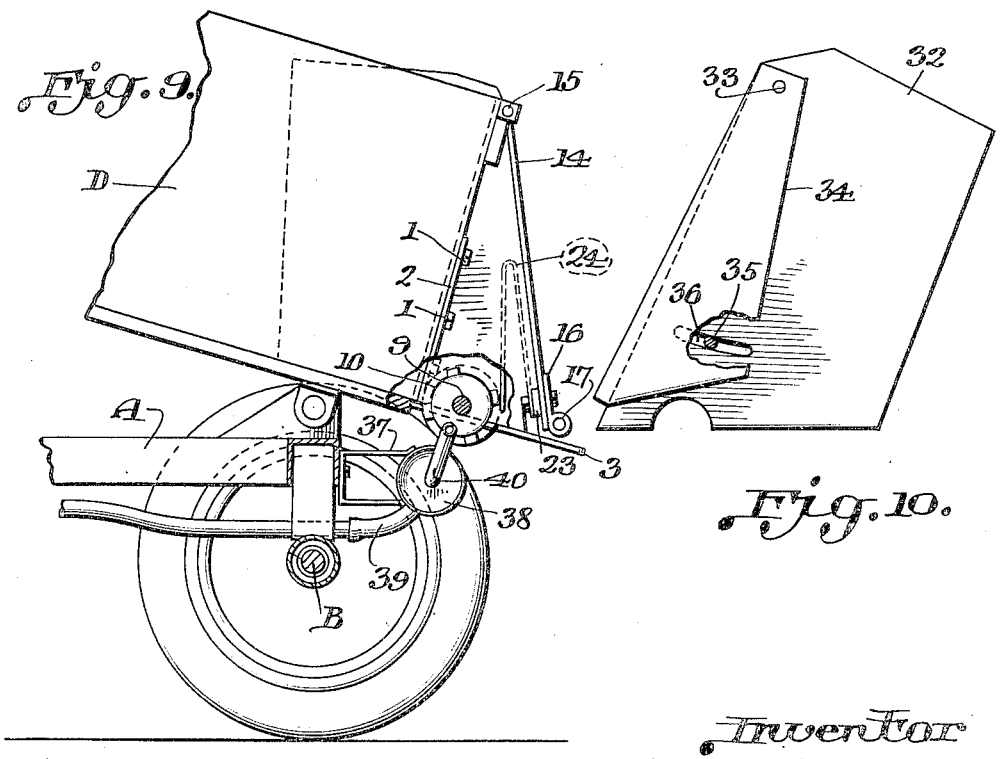
Inventor
Carl B. Urann
by his Attorneys Patented Nov. 9, 1926.

1,606,676

UNITED STATES PATENT OFFICE.

CARL B. URANN, OF WAREHAM, MASSACHUSETTS.

SPREADER.

Application filed June 24, 1925. Serial No. 39,264.

This invention relates to an attachment for vehicles, preferably motor driven, for the purpose of spreading sand, fertilizers, crushed stone or similar material evenly and to any desired thickness or depth.

An object of the invention is to provide means which may be driven from the wheels of the vehicle for causing the material to be delivered evenly and continuously from the vehicle while in movement.

A further object of the invention is to provide means whereby the attachment may be adjusted to vary the amount of material delivered in a given time.

A further object of the invention is the provision of a particular spring means for regulating the even delivery of the material.

A further object of the invention is to provide means for heating the delivering roll and driving pulleys in order that the sand or other material may not freeze thereto in cold weather and interfere with the proper operation of the device.

Other objects of the invention will be apparent from the following detail description and appended claims.

In the drawings:

Figure 1 is an end elevation of the attachment in position on the vehicle.

Figure 2 is a longitudinal section with the parts in elevation.

Figure 3 is a detail perspective view of a portion of the delivering roller.

Figure 4 is a side elevation of the attachment in position and in operative relation to the wheels of the vehicle.

Figure 5 is a side view of a detail.

Figure 6 is a perspective view of the end gate or tail board of the vehicle looking from the inside of the dump body.

Figure 7 is a perspective view of a bracket and bearing blocks which support certain portions of the mechanism.

Figure 8 is a rear view similar to Figure 1 showing the heating attachment in position.

Figure 9 is a side elevation with parts in section of the construction shown in Figure 8 and taken on line 9—9 of said figure.

Figure 10 is a side view of a modified form of the plate shown in Figure 5.

Figure 11 is a view of a modified form of driving device.

The construction embodying the subject matter of my invention can be attached to vehicles of widely varying types and therefore only a portion of the vehicle is shown. There is illustrated a portion of the chassis A, the rear axle B, rear wheel C, and dump body D. This dump body may be of the type which is tilted when it is desired to discharge the material or it may be of a type in which the floor slopes to the rear sufficiently for the material to move downward without tilting the body.

Fastened by bolts or suitable fastenings 1 to the rear ends of the sides of the body D are right angle brackets having a vertical portion 2 and a substantially horizontal portion 3. This horizontal portion is provided with slots 4 and bearing blocks 5 and 6 are held in adjusted position by screws or bolts 7 which pass through said slots and are threaded into the blocks 5 and 6. The bearing block 5 has openings 8 passing therethrough through which pass the spindles 9 of a roller 10 which is adapted to deliver the material from the vehicle. By suitable adjustment of the bearing blocks 5 and 6 the roller is positioned preferably so that its axis is substantially in the plane of the body of the vehicle although it may be located above said plane as illustrated. The roller is also positioned with relation to the end of the floor 12 so that strips 11 carried by the periphery of the roller will just clear the end of the floor as the roller rotates. These strips 11 may be of any desired number but are shown as being four in number and attached to the roller by screws. The materials of which these parts are formed may be varied as desired. The spindles 9 carried at or near their ends, pulleys or wheels 13 which are adapted to engage the periphery of the wheels C of the vehicle when the dump body is tilted into operative position and this frictional engagement is sufficient to cause the pulleys 13 and consequently the roller 10 to be rotated by the travel of the vehicle.

A tail board or end gate 14 has at its upper end a rod 5 the ends of which are suitably supported in the sides of the vehicle. Near the lower end there are attached to the tail board two strap members 16 having their ends forming eyes 17 in which slide members 18 and 19 both of which are pivoted to an operating member 20 which is pivoted to the tail board at 21. This construction is clearly shown in Figure 1 and it is obvious that by movement of the operating lever 20 the sliding members 18 and 19 can be moved inwardly and outwardly. When moved outwardly these members are adapted to engage in openings 22 in the bearing block 6 above described.

On the inside of the tail board near the bottom thereof is attached preferably by removable fastenings, a metal strip 23 which carries a series of steel springs 24 which are preferably in inverted V-shape form. These springs may be separate or they may be formed by slitting a single member which has its integral end fast to the strip 23.

The free ends of these springs 24 normally lie adjacent the strips 11 on the roller and are adapted to permit the passage of sand X between the springs and between the roller and the ends of the springs. It sometimes happens that the material to be spread contains large lumps such as stones Y and when these come against one or more of the spring members they will yield as shown in Figure 2 to permit the passage of such stone or other obstruction. This prevents the device from becoming clogged because of irregularity in the material to be distributed. Located a short distance above the upper portion of the springs and attached to one side of the tail board 14 is an iron guard 26 which tends to prevent sand or other material from getting in behind the springs 24.

Since as is noted the tail board or end gate does not hang at right angles to the floor of the body but is spaced with its lower end from the rear end of the body, in order to permit mounting of the above described attachment it is obvious that there would be a space at each side between the end gate and the body of the vehicle. To close these spaces plates or side pieces 27, such as shown in Figure 5, are employed. Each of these pieces has an inclined bottom portion 28 which rests on the floor of the vehicle, a circular cut out 29 which passes over the spindles of the rolls, a short inclined portion 30 which rests upon the bracket member 3, and a notched cut out 31 which fits over the metal strip 23. In this manner substantially all of the openings are closed through which material could escape and it will only be delivered by the rotation of the roll 10.

The modified form of these side pieces is shown in Figure 10 in which the main side piece 32 has pivoted at 33 thereto a swinging auxiliary member 34 which is held in adjusted relation to the plate 32 by means of a thumb screw 35 passing through a slot 36 in the plate 32 and threaded into or otherwise engaging the swinging member 34. By the use of this device and the adjustable bearing members above described, the attachment can be fitted to various types of vehicles.

It is frequently the case in cold weather that sand or other materials which is to be distributed is damp and since the pulleys and roll are of iron and cold the sand tends to freeze thereto, causing the roller to clog and the pulleys to slip. There is, accordingly provided as shown in Figures 8 and 9, a heating attachment for the purpose of heating the roller 10 and the driving pulleys 13. Fast to the chassis of the vehicle are brackets 37 which support a generally horizontal member 38 which is connected by a tube 39 to the exhaust from the engine. This tube 39 communicates with the cylinder 38 preferably near the middle of the latter. At each end the cylinder is provided with a short curved tube 40 so arranged as to discharge the heated exhaust therefrom directly upon the pulleys 13. The cylinder 38 is located closely adjacent the roller 10 and will be heated highly enough to prevent the sand or other material from freezing on the roller. The discharge from the pipes 40 on the pulleys 13 will also keep these heated sufficiently to prevent material freezing thereto and therefore causing the pulleys to slip.

As indicated in Figure 11, the spreader may be driven in a different manner from that above described. There is here shown a sprocket wheel 41 mounted on the axle of the vehicle and connected by a sprocket chain 42 to a sprocket wheel 43 on a stub shaft in the vehicle, which shaft also carries a sprocket wheel 44 driven by a sprocket chain 45 a sprocket wheel 46 mounted on a stub shaft 48. This shaft carries the pinion 47 which meshes with a corresponding pinion 49 on the shaft 9. In this modification the pulleys 13 are omitted. Other forms of driving means may be employed without departing from the invention.

It is obvious that the dimensions of the elements of the device may be varied widely in order to adapt the invention to various types of vehicles. The materials employed may be selected in accordance with the desire of the manufacturer and may also vary widely. It is also obvious that many minor changes can be made in the precise embodiment of the invention without in the slightest degree departing from the spirit of the invention which is to be regarded as limited only by the scope of the appended claims.

I claim:

1. In a spreading attachment for vehicle bodies, the sub-combination comprising brackets carried by the body, a shaft, a distributing roll carried by said shaft, means carried by said brackets for adjustably supporting said shaft, an end gate supported by said body and having positioning and locking means, means carried by said end gate and cooperating with said distributing roll to obtain uniform distribution of material, and means also adjustably carried by said brackets for engaging said positioning and locking means whereby the proper relation between body, roll and end gate can be maintained.

2. In a spreading attachment for vehicle bodies, the subcombination comprising a distributing roll supported near the rear end of the body, an end gate carried by said body, inverted V-shaped springs each attached at one end to the end gate and having its other end in cooperative relation with said roll to permit passage of obstructions therebetween and obtain a uniform spread of material.

3. In a spreading attachment for vehicles driven by the usual engine, the subcombination of a distributing roll, a cylinder adjacent thereto, and means connecting said cylinder with the engine exhaust to heat said cylinder whereby the roll is heated by radiation from the cylinder.

4. In a spreading attachment for wheeled vehicles driven by the usual engine, the subcombination comprising a distributing roll, driving pulleys carried thereby and driven by frictional contact with the wheels of the vehicle, a cylindrical member adjacent said roll, means connecting the member with the engine exhaust whereby the roll is heated by radiation from said member, and means for discharging the exhaust from the ends of said member on to the pulleys to heat the same.

5. In a spreading attachment for vehicle bodies having an opening therein, the subcombination comprising a distributing roll adjustably supported near said opening, and inverted V-shaped springs each supported at one end on a fixed part and having its other end in cooperative relation with said roll so that the spring means yields to permit passage of obstructions and assists in obtaining a uniform spread of material.

In testimony whereof, I have hereunto subscribed my name.

CARL B. URANN.